Dec. 1, 1931. A. B. BROWN 1,834,824
IMPACT SHOCK ABSORBER
Filed April 28, 1930   3 Sheets-Sheet 1

Inventor:
ARTHUR B. BROWN
By
Attorney

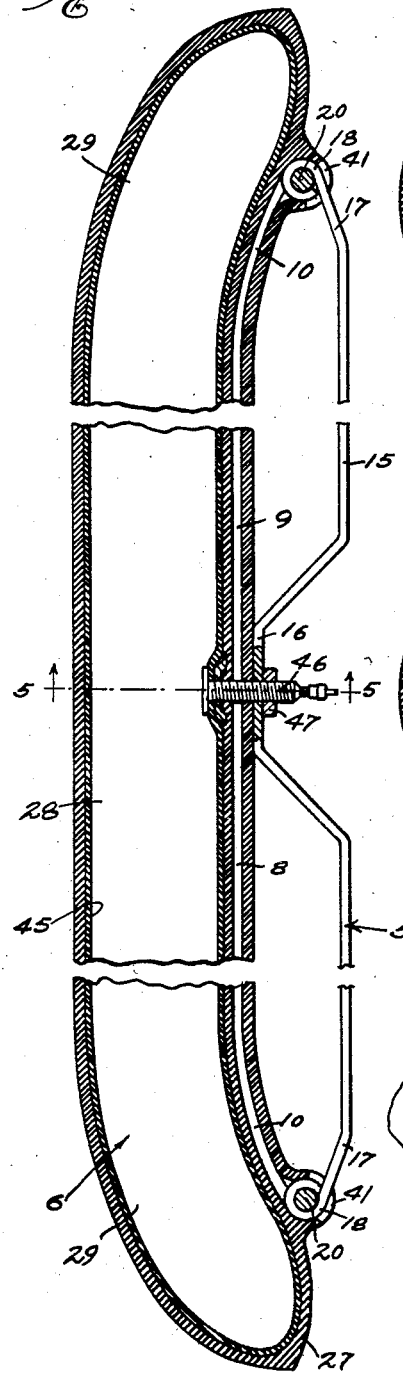
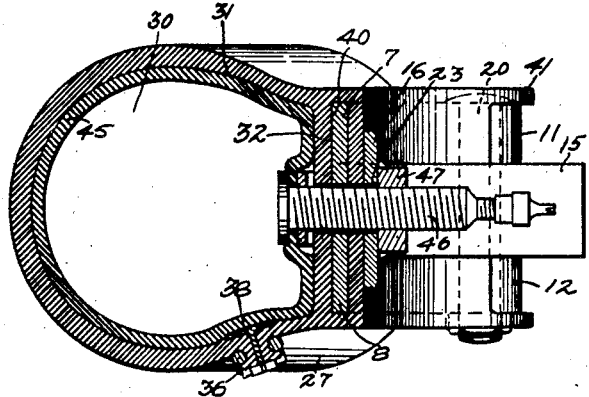
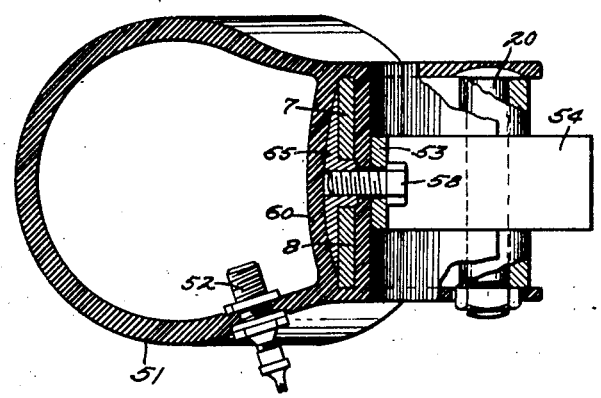
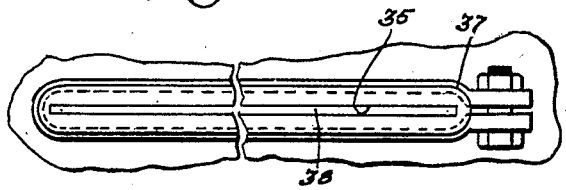

Dec. 1, 1931.  A. B. BROWN  1,834,824
IMPACT SHOCK ABSORBER
Filed April 28, 1930   3 Sheets-Sheet 3
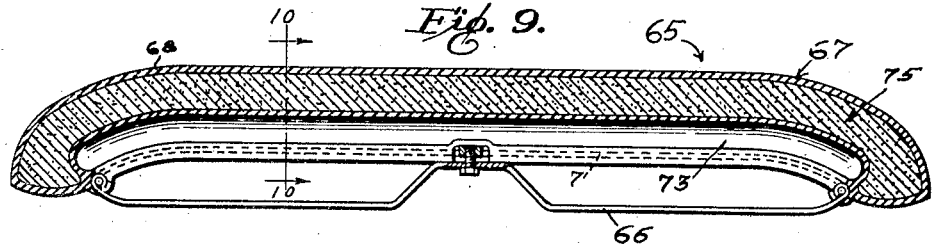
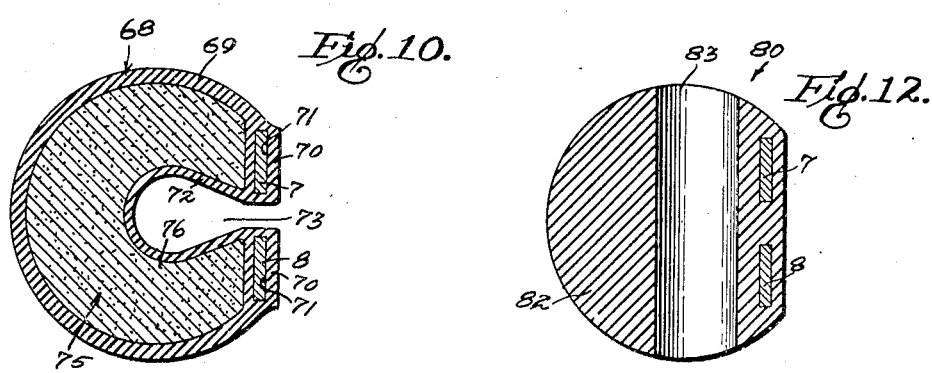
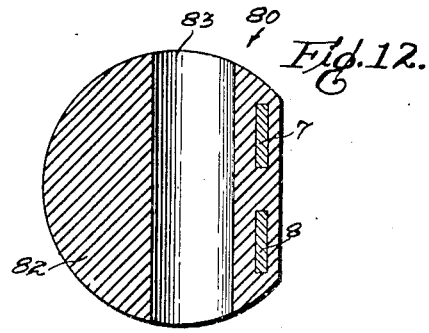
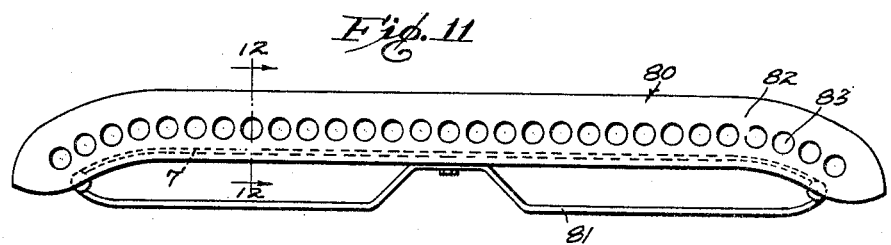
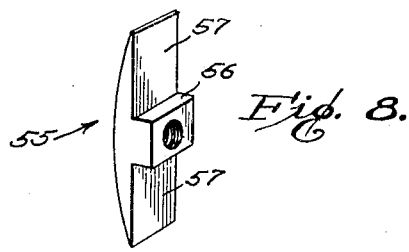
Inventor:
ARTHUR B. BROWN
By Dana E. Keech
Attorney Patented Dec. 1, 1931

1,834,824

UNITED STATES PATENT OFFICE

ARTHUR B. BROWN, OF LOS ANGELES, CALIFORNIA

IMPACT SHOCK ABSORBER

Application filed April 28, 1930. Serial No. 447,812.

My invention relates to shock absorbing devices and particularly to yieldable guards for absorbing the impact of collisions.

In the operation of land vehicles, or those supported by air or water, there is necessity for protecting these vehicles from being damaged in case of collision with one another or with stationary objects. It is the general practice to place a yieldable guard on the vehicle itself, such as the well known "automobile bumper", or to put a guard on the stationary object with which vehicles are likely to collide. Thus we find stationary guards on wharves and docks, and in hangars and garages at points where ships, airplanes or automobiles, as the case may be, are likely to collide with the stationary structure. While my invention is adaptable to use on stationary objects it is particularly useful when applied to moving vehicles and the embodiments disclosed herein were designed for use upon automobiles in the same manner as the present "bumpers" are used thereon.

Where there is a collision between a vehicle and another object, one of which is equipped with an impact shock absorber, the degree of damage suffered by the vehicle and its occupants usually varies inversely as the ability of the shock absorber to absorb the kinetic energy released in the impact.

It is an object of my invention to provide an impact shock absorber which has a relatively high ability to absorb kinetic energy.

The common automobile bumper is formed of steel springs which generally contact the article collided with at only a single spot. This applies a tremendous force locally which bends the spring so that the full resiliency of the latter is not brought into play.

It is another object of my invention to provide an impact shock absorber which will conform sufficiently to an object collided with so as to prevent injury of the shock absorber and make available the full resiliency thereof.

It is a further object of my invention to provide an impact shock absorber in which the primary or most resistant shock absorbing element is gradually brought into play by means of a secondary or intermediate shock absorbing agency. This makes it possible to make the primary element considerably stiffer and thus materially increase the device's ability to absorb kinetic energy.

Certain modern vehicles, such as automobiles, have highly polished exterior surfaces which can be easily scratched, particularly by metal forcibly contacting them. The "bumpers" in general use today on automobiles, are formed entirely of metal. Conditions in driving automobiles in congested traffic and parking them in small curb spaces result inevitably in few automobiles escaping getting their body and fenders scratched by contact with these bumpers on other cars.

It is yet another object of my invention to provide a collision shock absorber which will not scratch a polished surface on a vehicle when contacting that surface.

Spring steel automobile bumpers are in common use and their construction is fairly standardized. A preferred embodiment of my invention includes a primary stiff structure, which may consist of an ordinary spring steel bumper, and a secondary nonmetallic resilient structure such as an inflated rubber casing, which is united with the primary structure so as to yieldably transmit to the stiff structure the impact of any collision.

It is a still further object of my invention to provide a non-metallic resilient member which may be made and sold separately and which is adapted to be assembled upon a spring steel automobile bumper in the manner and for the purpose above indicated.

The manner of accomplishing the foregoing objects, as well as further objects and advantages will be made manifest in the following description and in the accompanying drawings, in which:

Fig. 4 is an enlarged fragmentary horizontal sectional view taken on the line 4—4 of Fig. 3.

Fig. 5 is a vertical transverse sectional view taken on the line 5—5 of Fig. 4.

Fig. 6 is a fragmentary bottom plan view taken in the direction of arrow 6 in Fig. 5.

Fig. 7 is a transverse vertical sectional view taken on the same line as Fig. 5 but illustrating a modified form of pneumatic bumper embodying my invention.

Fig. 8 is a perspective view of a special grip nut used in the construction of the modification illustrated in Fig. 7.

Fig. 9 is a horizontal sectional view taken on the same plane as Fig. 4 and illustrating a second modified form of my invention.

Fig. 10 is a vertical transverse sectional view taken on the line 10—10 of Fig. 9.

Fig. 11 is a plan view of a third modification of my invention.

Fig. 12 is a transverse vertical sectional view taken on the line 12—12 of Fig. 11.

Figure 1:
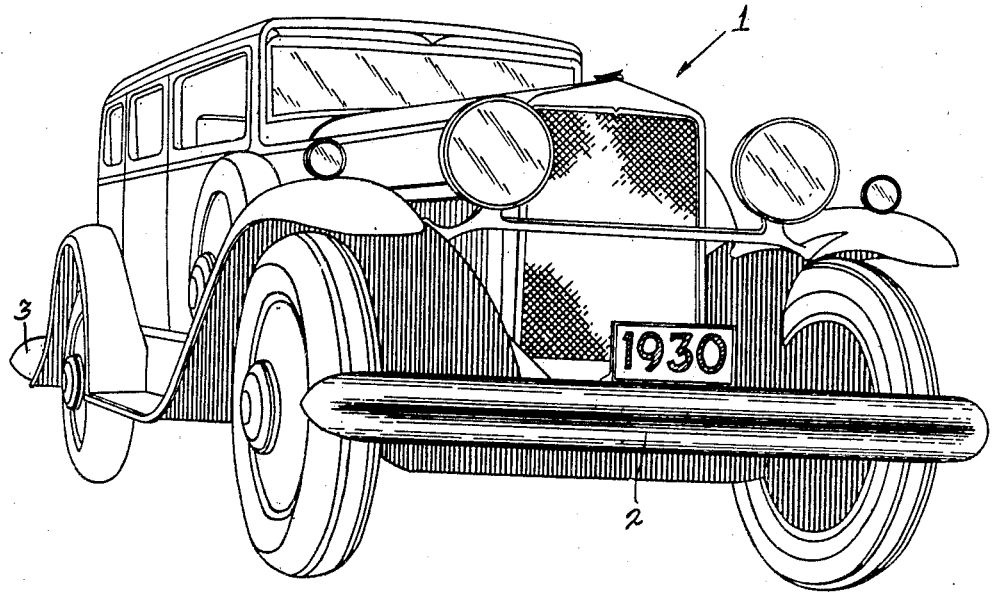
Fig. 1 is a perspective view of an automobile equipped with a preferred embodiment of my invention.
Figure 3:
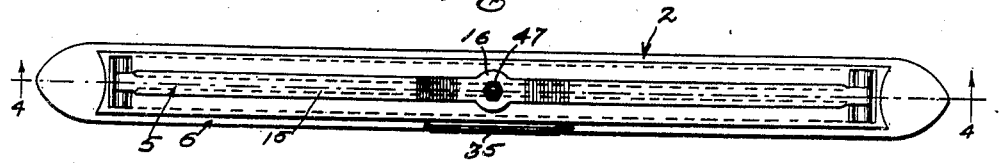
Fig. 3 is a rear elevational view taken in the direction of the arrow 3 in Fig. 2.

Referring specifically to the drawings, and particularly to Figs. 1 to 6 inclusive, the numeral 1 indicates an automobile having front and rear impact shock absorbers 2 and 3, mounted on the frame thereof. These shock absorbers may be of different types or they may be identical, as desired. In the present instance it will be assumed that these are identical and are constructed according to the views in Figs. 2 to 6 inclusive.

The shock absorber 2 which is the preferred embodiment of my invention, includes a primary shock absorbing structure 5 and a secondary non-metallic shock absorbing structure 6. The structure 5 includes two steel springs 7 and 8 having practically straight middle portions 9 and curved end portions 10. The extremities of the springs 7 and 8 are coiled into eyes 11 and 12 respectively.

Figure 2:
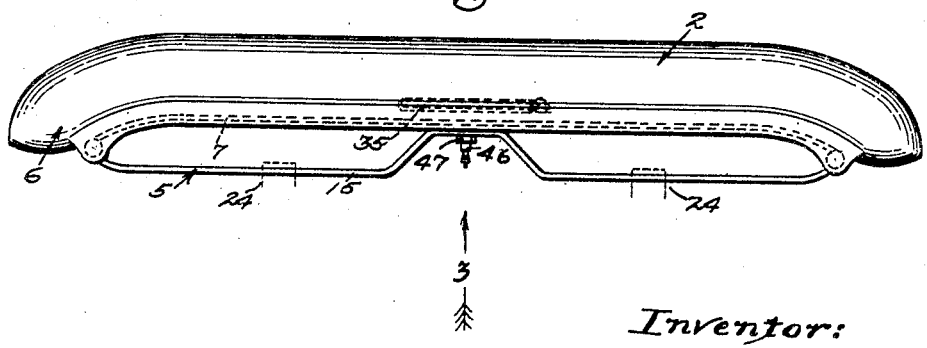
Fig. 2 is a plan view of the impact shock absorber shown in Fig. 1.

Disposed behind the springs 7 and 8 is a spring mounting member 15 bent as shown in Figs. 2 and 4 so that a middle portion 16 thereof is disposed close to mid-portions of the springs 7 and 8 and end portions 17 of the spring mounting member are bent forwardly and coiled to provide eyes 18. The eyes 18 are adapted to be disposed between adjacent pairs of the eyes 11 and 12 and connected thereto by bolts 20.

For a purpose which will be disclosed later, the center portion 16 of the member 15 is enlarged and is provided with a central opening 23.

In mounting the shock absorber 2 upon the frame of vehicle 1, clamps 24, of any suitable type, as indicated by dotted lines in Fig. 2, may be employed. These clamps are rigidly applied upon the frame of the vehicle and rigidly clamp the spring mounting member 15 in the positions shown in Fig. 2.

The secondary shock absorbing structure 6 preferably includes a casing 27 which is preferably fabricated or molded of rubber or some other suitable flexible or resilient composition and is adapted to be mounted upon the springs 7 and 8 and is to be inflated with air or some other yieldably resisting material so that upon the shock absorber 2 impacting against some object the casing 27 will conform to that object and the force of the impact will be transmitted gradually to the primary structure 5 and will greatly assist in decreasing the relative speed of the vehicle equipped with the shock absorber 2 and the object with which it is colliding. While the casing 27 may be any desired shape, the preferred conformation of this is shown in the drawings, in which a middle portion 28 thereof is straight and end portions 29 thereof have a curvature corresponding to the end portions 10 of the springs 7 and 8. The casing 27 has provided therein and extending from end to end thereof, a closed pneumatic chamber 30 which is surrounded by a substantially semi-cylindrical wall 31 and a vertical wall 32 disposed at the rear of the casing.

Provided centrally in a lower portion of the wall 31 is an opening 35 for a purpose to be disclosed later. Extending from the wall 31 alongside the opening 35 are beaded lips 36 which are adapted to be clamped together by any suitable means such as a clamp 37 for closing this opening. In order to insure the tight closing of this opening, a gasket 38 of T-shaped cross section, is provided, which is placed in the opening at the time of applying the clamp.

The wall 32 is considerably thicker than the wall 31 and has provided therein practically throughout its length a cavity or passage 40 into which the springs 7 and 8 are adapted to be slipped when the casing 28 is deflated and one of the bolts 20 is removed. When these springs are extended through the passage 40 the bolt 20 which was removed is replaced and end portions of the structure 5 are allowed to fit into chambers provided at ends of the passage 40 by rearward extensions 41 of the material of the casing, as clearly shown in Figs. 2, 4 and 5.

In order to inflate the casing 27 an inner tube 45 is provided which is shaped so as to fit the resiliency chamber 30 as shown in Figs. 4 and 5. The inner tube 45 is placed in the chamber 30 through the opening 35 and has an ordinary valve stem 46 which is adapted to extend through a suitable aperture in the wall 32 which is aligned with the hole 23 in the spring mounting member 15 and receive a nut 47 so as to tightly clamp the middle portion 16 of the member 15 against the casing wall 32. When the assembly of the shock absorber 2 has reached this point the inner tube 45 may be inflated through the valve stem 46 and the shock absorber is then ready to be mounted for use upon a vehicle or other movable or immovable object in the manner indicated in Fig. 2.

While it is not necessary, it may be found preferable to cement the springs 7 and 8 into the passage 40. The gasket 38 is useful in preventing any pinching of the inner tube 45 in the opening 35.

While it is preferable that the casing 27 be formed of rubber, it is desired that this term when used in the claims shall be broadly interpreted to cover the use of other resilient or flexible materials such as fabrics which would be substantially the equivalent of rubber when used in the construction of this element.

It is furthermore desired to point out that while the various manners in which the casing 27 might be constructed have not been gone into here, it is understood that any engineer skilled in the art of tire construction would easily provide the necessary strength to the casing 27 so that it might perform the functions described for it herein.

Figs. 7 and 8 illustrate a modified form of shock absorber 50 which is substantially the same as the shock absorber 2 excepting that the casing 51 thereof has no inner tube, but is itself a tight air container which can be inflated through a valve stem 52 provided therein. In the shock absorber 50 a middle portion 53 of the spring mounting member 54 is secured to the springs 7 and 8 by means of a clamp nut 55 which has a square middle portion 56 and clamp arms 57. The nut 55 is positioned as shown in Fig. 7 when the shock absorber 50 is assembled and a cap screw 58 extends through a suitable aperture in the spring mounting member portion 53, and an aligned aperture in the rear portion of the vertical casing wall 60 and through the nut 55.

In Figs. 9 and 10 I show a modified form of shock absorber 65 which has a primary shock absorbing structure 66 which is practically identical with the shock absorbing structure 5 as modified in the shock absorber 50. Mounted upon the structure 66 is a secondary shock absorbing structure 67 which includes a casing 68 having a semi-cylindrical wall 69 and vertical walls 70 which are provided with passageways 71 therein into which the spring members 7 and 8 extend. Adjacent ends of the vertical walls 70 are connected by inwardly extending walls 72 forming an internal pocket 73. Between the walls 69, 70 and 72 a resiliency chamber 75 is formed which is preferably filled with resilient material such as a mass of liquid rubber or sponge rubber 76.

As will be readily understood, the internal pocket 73 adds considerably to the resiliency of the secondary shock absorbing structure 67. The shock absorber 65 has the great advantage of not requiring attention for keeping it properly inflated.

The secondary structure 67 is adapted to be assembled upon the primary structure 66 in substantially the same manner as described in connection with the shock absorber 2.

In Figs. 11 and 12 I have shown another modification 80 of my invention, in which the primary structure 81 is similar to the corresponding structure 66 of the shock absorber 65 and a secondary shock absorbing structure 82 is provided in the form of a solid body of rubber vulcanized over the springs 7 and 8 and provided with a series of openings such as the openings 83 for adding to the resiliency of the structure 82. The shock absorber 80 also has the advantage of the shock absorber 65 of not having to be inflated and is adaptable for use in situations where much greater wearing ability is required and where harder shocks must be taken by the shock absorber.

While I have shown and described but four embodiments of my invention, it is to be understood that modifications and changes can be readily made in the details of constructing these without departing from the spirit of the invention or the scope of the appended claims.

While my invention includes the combination of primary and secondary shock absorbing structures, the secondary non-metallic resilient structure may be manufactured and sold separately from the primary metallic structure and it is desired herewith to fully cover the non-metallic secondary shock absorbing structure as an article of manufacture. It is contemplated that the secondary structure will be manufactured for several of the best known types of automobile bumper springs, so that they can be applied without difficulty to these springs to provide the combination of my invention referred to above.

What I claim is:

1. In an impact shock absorber, the combination of: a relatively stiff backing member; means for mounting said member across a vehicle and in advance thereof in the direction of travel; a yieldable body disposed in front of and secured to said member; and a resilient mass of solid material disposed within said body and yieldably supporting the walls thereof against deformation.

2. In an impact shock absorber, the combination of: a relatively long and slender spring steel backing member; means for mounting said member across a vehicle and in advance thereof in the direction of travel; a yieldable body disposed in front of and secured to said member; and a resilient mass of solid material disposed within said body and yieldably supporting the walls thereof against deformation.

3. In an impact shock absorber, the combination of: a relatively straight stiff backing member; a resilient rubber member of substantial size disposed in front of said backing member, there being an opening in said rubber member through which said backing member extends; and means for supporting said backing member across a vehicle and in advance thereof in the direction of travel, said means attaching to opposite side portions of said backing member.

4. In an impact shock absorber, the combination of: a relatively straight rubber impact receiving casing slightly curved at its opposite ends, there being a passage formed in a rear portion of said casing which substantially follows the longitudinal conformation thereof; a spring member shaped similarly to said passage and which can be placed in said passage when said casing is deflated; means for inflating said casing; and means attached to said spring member for supporting said shock absorber.

5. In an impact shock absorber, the combination of: a leaf spring; a rubber body in the material of which said spring is imbedded; and means for supporting said shock absorber on one end of an automobile.

6. In an impact shock absorber, the combination of: a leaf spring; a relatively large rubber body having a passage along the rear portion thereof formed to fit said spring and in which said spring is disposed; and means for supporting said shock absorber on one end of an automobile.

7. As an article of manufacture, a relatively straight rubber member of substantial size adapted to be applied to a spring bumper of an automobile, said member having a passage formed longitudinally in the material thereof said passage being adapted to snugly receive a leaf spring of said bumper in order to secure said member thereto.

8. In an impact shock absorber, the combination of: a yieldable metallic bumper adapted to be mounted transversely of an automobile; a resilient member of substantial size adapted to be secured upon the forward face of said bumper, said member having a distortion cavity formed longitudinally and substantially centrally therein.

9. In an impact shock absorber, the combination of a hollow, tubular body formed of flexible material; means for supporting said body transversely and in advance of a motor vehicle; an inner tube adapted to be disposed within said body and inflated therein, there being a slot formed longitudinally in said body beneath a center portion thereof, lips formed on said body adjacent said slot; and a clamp adapted to clamp said lips together to prevent said inner tube being expelled through said opening before it is inflated.

10. A combination as in claim 9, in which a plug having a T-shaped cross section is provided to be disposed in said slot when said clamp is applied, to prevent the pinching of said tube.

11. In an impact shock absorber, the combination of a relatively long, straight, rubber impact receiving casing closed at both ends; means for inflating said casing; a relatively strong leaf spring embedded in the rubber of said casing along the rear edge thereof; and spring means for supporting said leaf spring and secured to the ends thereof and to a central portion thereof.

12. In an impact shock absorber, the combination of a relatively long, straight, rubber impact receiving casing closed at both ends; means for inflating said casing; a relatively strong leaf spring embedded in the rubber of said casing along the rear edge thereof; spring means for supporting said leaf spring and secured to the ends thereof and to a central portion thereof; and a stem for inflating said casing, such stem extending through said leaf spring at its central point of juncture with said spring means.

In testimony whereof, I have hereunto set my hand at Los Angeles, California, this 22nd day of April, 1930.

ARTHUR B. BROWN.